United States Patent
Omura et al.

(10) Patent No.: US 12,355,107 B2
(45) Date of Patent: Jul. 8, 2025

(54) BUS BAR AND CELL STACK

(71) Applicant: Panasonic Intellectual Property Management Co., Ltd., Osaka (JP)

(72) Inventors: Tetsuji Omura, Hyogo (JP); Shingo Kume, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/675,490

(22) Filed: May 28, 2024

(65) Prior Publication Data
US 2024/0313360 A1  Sep. 19, 2024

Related U.S. Application Data

(63) Continuation of application No. 16/980,521, filed as application No. PCT/JP2019/009774 on Mar. 11, 2019, now Pat. No. 12,021,265.

(30) Foreign Application Priority Data

Mar. 28, 2018  (JP) ................................. 2018-062002

(51) Int. Cl.
*H01M 50/502* (2021.01)
*H01M 50/50* (2021.01)
*H02G 5/00* (2006.01)
*H01R 4/02* (2006.01)

(52) U.S. Cl.
CPC ......... *H01M 50/502* (2021.01); *H01M 50/50* (2021.01); *H02G 5/005* (2013.01); *H01R 4/029* (2013.01)

(58) Field of Classification Search
CPC ..... H01M 50/502; H01M 50/50; H02G 5/005
USPC ......................................................... 429/158
See application file for complete search history.

(56) References Cited

U.S. PATENT DOCUMENTS

| 2012/0009461 A1 | 1/2012 | Kim et al. |
| 2018/0151862 A1 | 5/2018 | Bessho et al. |

FOREIGN PATENT DOCUMENTS

| JP | 2012-018904 A | 1/2012 |
| WO | 2017/017915 A1 | 2/2017 |

OTHER PUBLICATIONS

International Search Report of PCT application No. PCT/JP2019/009774 dated May 7, 2019.

(Continued)

*Primary Examiner* — James M Erwin
(74) *Attorney, Agent, or Firm* — Rimon P.C.

(57) ABSTRACT

A bus bar has: a first joint part connected to an output terminal of the first cell; a second joint part connected to an output terminal of the second cell; and a projection that is disposed between the first joint part and the second joint part and protrudes in a stacking direction in which the cells and the bus bar are stacked. The projection has a first inclined part extending from the first joint part and has a second inclined part extending from the second joint part. The first inclined part and the second inclined part are arranged in such a manner that the first inclined part and the second inclined part are aligned with a predetermined interval W and that the predetermined interval gradually becomes wider from a first end side toward a second end side.

4 Claims, 4 Drawing Sheets

(56) References Cited

OTHER PUBLICATIONS

Non-Final Office Action dated Aug. 2, 2023 issued in U.S. Appl. No. 16/980,521.
Final Office Action dated Nov. 20, 2023 issued in U.S. Appl. No. 16/980,521.
Notice of Allowance dated Feb. 29, 2024 issued in U.S. Appl. No. 16/980,521.

BUS BAR AND CELL STACK

CROSS-REFERENCE OF RELATED APPLICATIONS

This application is a Continuation Application of U.S. patent application Ser. No. 16/980,521, filed on Sep. 14, 2020, which is the U.S. National Phase under 35 U.S.C. § 371 of International Patent Application No. PCT/JP2019/009774, filed on Mar. 11, 2019, which claims the benefit of Japanese Application No. 2018-062002, filed on Mar. 28, 2018, the entire contents of each are hereby incorporated by reference.

TECHNICAL FIELD

The present invention relates to a bus bar and cell stack.

BACKGROUND ART

As a power source for, for example, a vehicle and the like that require a high output voltage, there is known a cell stack configured with a plurality of electrically-connected battery cells. In such a conventional cell stack, output terminals of neighboring cells are connected to each other with a bus bar.

A known bus bar has a structure in which a plurality of plates are stacked (see PTL 1, for example). The stack structure can reduce rigidity of the bus bar. With this arrangement, the bus bar can absorb a force caused by vibration of the cell or other causes and applied to a connecting part between the bus bar and the cell. As a result, it is possible to improve connection reliability between the bus bar and the cell.

CITATION LIST

Patent Literature

PTL 1: Unexamined Japanese Patent Publication No. 2012-18904

SUMMARY OF THE INVENTION

In recent years, the capacity of the cell has been increased, and an amount of swelling of the cell tends to increase. When a cell swells, an amount of a change in dimension of the cell increases particularly in a stacking direction of the cells. Therefore, a load applied to the connecting part between the bus bar and the cell tend to increase. To address this issue, it is considered to deal with the increase of the load applied to the connecting part by an arrangement where a projection curved in a direction in which the projection comes close to or gets away from the cells so that the curvature can increase flexibility of the bus bar in a pulling direction.

As a result of an earnest study of providing a projection to a stacked-plate type bus bar, the inventors of the present invention have recognized the following issues. Specifically, when plates having a projection in the same shape are stacked, there can be created gaps between the plates. The gaps between the plates can be a hindrance to a process of welding the plates. When the hindrance makes the welding unstable, an electric resistance of the bus bar thus increases and may deteriorate output characteristics of the cell stack. In addition, the gaps between the plates may increase a dimension of the bus bar in a stacking direction of the plates.

In order to stack the plates without creating any gap between the plates, it is necessary to provide projections having different sizes among a plate constituting an outer side of the curvature of the projection and a plate constituting the inner side of the curvature. However, in this case, it is necessary to prepare a plurality of dies each corresponding to the plate in each shape, so that production cost of the bus bar can be increased.

The present invention is made in view of the above situation, and an object of the present invention is to provide a technique to increase flexibility of a stacked-plate type bus bar while controlling or suppressing creation of gaps between the plates and an increase in production cost.

An aspect of the present invention is a bus bar. The bus bar that has a structure in which a plurality of plates are stacked and that electrically connects a first cell and a second cell, and the bus bar includes: a first joint part connected to an output terminal of the first cell; a second joint part connected to an output terminal of the second cell; and a projection that is disposed between the first joint part and the second joint part and protrudes in a stacking direction in which the cells and the bus bar are stacked. The projection has a first inclined part extending from the first joint part in such a direction that the first inclined part comes close to or gets away from the cells and has a second inclined part extending from the second joint part in such a direction that the second inclined part comes close to or gets away from the cells. The first inclined part and the second inclined part are arranged in such a manner that the first inclined part and the second inclined part are aligned with a predetermined interval in a first direction in which the first joint part and the second joint part are aligned and that the predetermined interval gradually gets wider from a one end side toward the other end side in a second direction intersecting the first direction as viewed from the stacking direction.

Another aspect of the present invention is a cell stack. The cell stack includes: the bus bar of the above aspect; and a plurality of cells electrically connected to each other with the bus bar.

The present invention can increase flexibility of a stacked-plate type bus bar while controlling or suppressing creation of gaps between the plates and an increase in production cost.

DESCRIPTION OF EMBODIMENT

Figure 1:
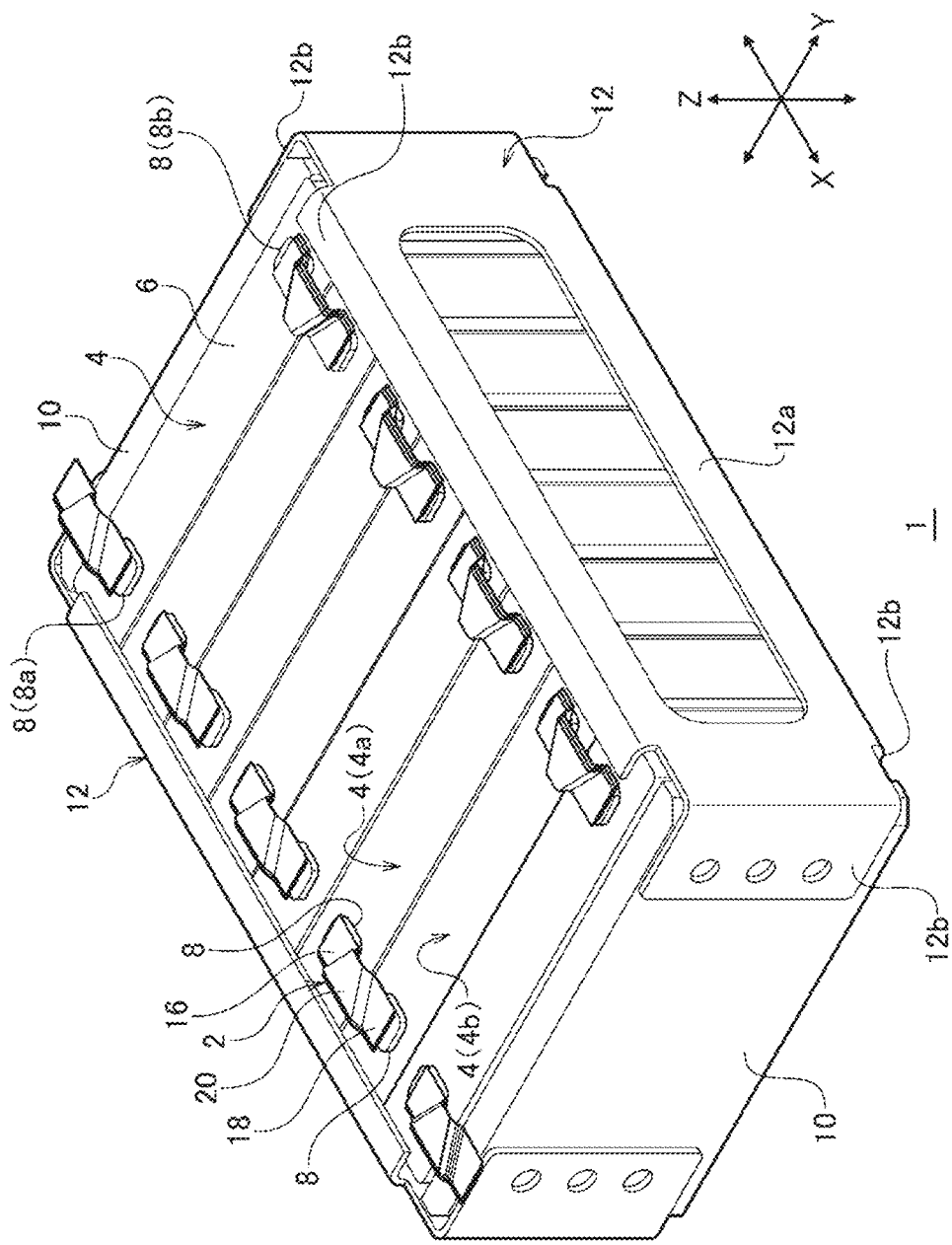
FIG. 1 is a perspective view of a schematic structure of a cell stack according to an exemplary embodiment.

In the following, the present invention will be described on the basis of a preferred exemplary embodiment with reference to the drawings. The exemplary embodiment does not limit the invention but is an example; therefore, not all features described in the exemplary embodiment and combinations of the features are necessarily essential to the invention. The same reference marks are assigned to the same or equivalent components, members, and processes shown in the drawings, and a redundant description will be omitted. Further, scales and shapes of the parts shown in the drawings are determined for descriptive purposes, and the scales or shapes should not be interpreted as limitation unless otherwise mentioned. Further, in some cases, even the same members are shown on slightly different scales between different drawings. Further, the term "first", "second", or the like, when used in the present description or the claims, does not mean any order or degree of importance unless otherwise mentioned, but is intended to distinguish one component from the others.

FIG. 1 is a perspective view of a schematic structure of a cell stack according to an exemplary embodiment. Cell stack 1 includes: a plurality of bus bars 2; and a plurality of cells 4 electrically connected to each other with the bus bars 2.

Each cell 4 is a rechargeable secondary battery such as a lithium ion battery, a nickel-metal-hydride battery, or a nickel-cadmium battery. Cell 4 is a so-called prismatic (=rectangular) battery, and has an outer jacket (=case) having a flattened rectangular parallelepiped shape. A substantially rectangular opening is formed in one surface of the outer jacket. An electrode body, an electrolyte, and the like are put into the outer jacket through this opening. On the opening of outer jacket, there is provided sealing plate 6 to seal the outer jacket.

On sealing plate 6, positive output terminal 8 is provided near one end in a longitudinal direction, and negative output terminal 8 is provided near the other end. Hereinafter, positive output terminal 8 is referred to as positive terminal 8a, as appropriate, and negative output terminal 8 is referred to as negative terminal 8b, as appropriate. Further, when there is no need to distinguish the polarity of output terminal 8, positive terminal 8a and negative terminal 8b are collectively referred to as output terminal 8. The outer jacket, sealing plate 6, and output terminals 8 are conductor and is made of, for example, metal. In addition, sealing plate 6 is provided with a safety valve (not shown) between the pair of output terminals 8. The safety valve is configured to open when an internal pressure of the outer jacked rises to a predetermined value or higher so that the gas inside the outer jacket can be released.

In the present exemplary embodiment, the side on which the output terminals 8 are provided is a top surface of cell 4, and the opposite side is a bottom surface of cell 4. Further, cell 4 has two main surfaces connecting between the top surface and the bottom surface. These main surfaces have the largest area of the six surfaces of cell 4. The two surfaces other than the top surface, the bottom surface, and the two main surfaces are side surfaces of cell 4. Further, a top surface side of cells 4 is assumed to be a top surface of cell stack 1, a bottom surface side of cells 4 is assumed to be a bottom surface of cell stack 1, and a side surface side of cells 4 is assumed to be a side surface of cell stack 1. For the sake of convenience, the top surface side of cell stack 1 is assumed to be the upward direction in the vertical direction, and the bottom surface side of cell stack 1 is assumed to be the downward direction in the vertical direction.

The plurality of cells 4 are stacked with predetermined intervals in such a manner that the main surfaces of neighboring cells 4 are opposed to each other. Note that the term "stack" means to arrange a plurality of members in any one direction. Therefore, stacking of cells 4 also includes horizontally arranging a plurality of cells 4. Further, cells 4 are disposed such that output terminals 8 are directed in the same direction. In the present exemplary embodiment, output terminals 8 are directed upward in the vertical direction, for the sake of convenience. Neighboring two cells 4 are stacked such that positive terminal 8a of one battery and negative terminal 8b of the other battery are adjacent to each other. Positive terminal 8a and negative terminal 8b are electrically connected via bus bar 2. However, in one case, the same polarity output terminals of the neighboring two cells 4 can be connected to each other with a bus bar.

Bus bar 2 is a metal member having an approximately belt shape. Bus bar 2 is electrically connected to output terminal 8 of each cell 4, for example, by welding. A structure of bus bar 2 will be described later in detail.

Cell stack 1 has a plurality of separators (not shown). The separator is also referred to as insulating spacer and is made of, for example, a resin having insulation properties. The separators are each disposed between cells 4, and between cell 4 and end plate 10 to be described later. This arrangement insulates between outer jackets of neighboring cells 4. Further, the outer jackets of cells 4 and end plates 10 are insulated from each other.

Further, cell stack 1 has a pair of end plates 10. End plates 10 are each made of, for example, a metal plate. The plurality of stacked cells 4 and the plurality of separators are sandwiched by the pair of end plates 10. The pair of end plates 10 are arranged in a stacking direction of cells 4 (hereinafter, the direction is referred to as cell stacking direction X) and are located adjacent to the outermost cells 4 with a separator. Note that bus bars 2 on the outer most sides in the cell stacking direction X function also as external connection terminals.

Further, cell stack 1 has a pair of restraining members 12. The pair of restraining members 12 restrain stacked cells 4, the separators, and end plates 10. The pair of restraining members 12 are also referred to as binding bars. The pair of restraining members 12 are arranged in a horizontal direction Y (the direction represented by arrow Y in FIG. 1) intersecting the cell stacking direction X. The horizontal direction Y is a direction in which output terminals 8 are aligned in each cell 4. Each restraining member 12 has rectangular flat part 12a parallel to the side surfaces of cells 4 and overhangs 12b each projecting from an end part of each side of flat part 12a to a cells 4 side. Restraining member 12 can be formed by bending each side of a rectangular metal plate, for example.

Two overhangs 12b facing each other in the cell stacking direction X are fixed to the pair of end plates 10 with bolts. With this arrangement, the pair of end plates 10 and the pair of restraining members 12 fasten the plurality of cells 4 and the plurality of separators. The plurality of cells 4 are positioned in the cell stacking direction X by being fastened in the cell stacking direction X by restraining members 12. Further, the plurality of cells 4 are vertically positioned by the bottom surfaces being in contact with overhangs 12b on the lower side of restraining members 12 with the insulators between the bottom surfaces and overhangs 12b and by the top surfaces being in contact with overhangs 12b on the upper side of restraining members 12 with the insulators between overhangs 12b and the top surfaces. Note that parts of the separators can be used as insulators between the bottom surfaces and/or top surfaces and overhangs 12b. In this state, bus bars 2 are electrically connected to output terminals 8 of each cell 4, and cell stack 1 is consequently obtained.

Figure 2:
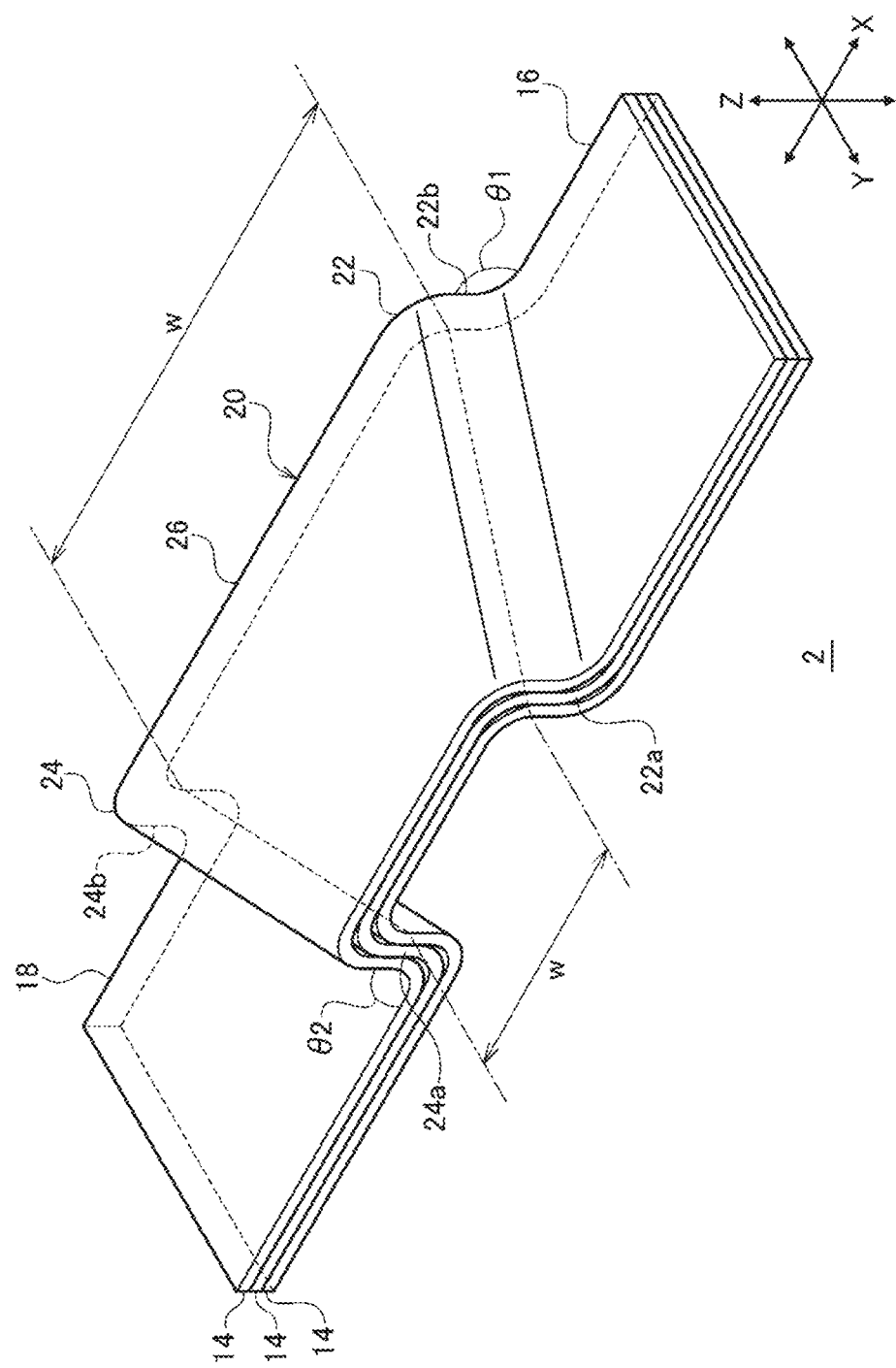
FIG. 2 is a perspective view showing a schematic structure of a bus bar.
Figure 3:
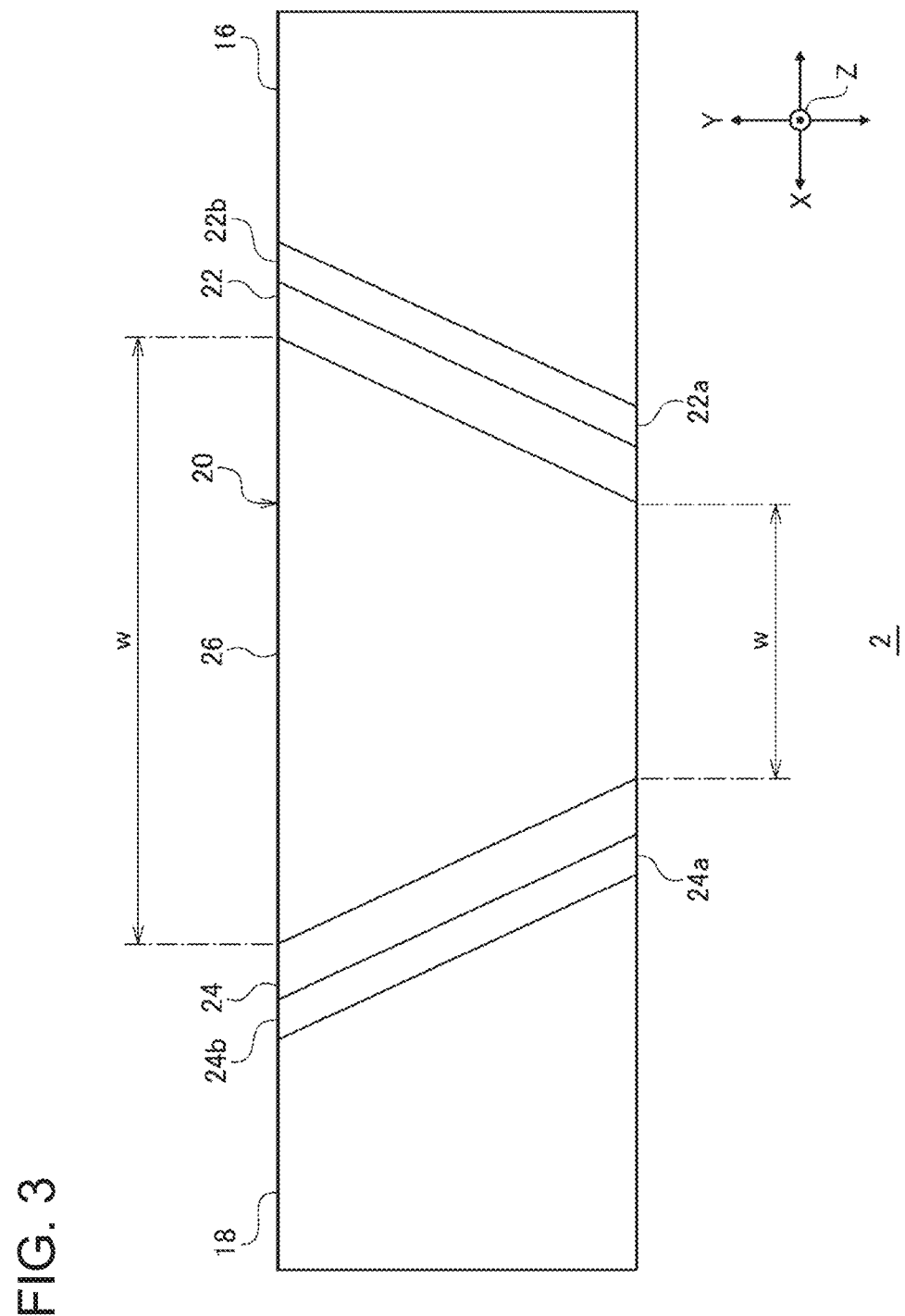
FIG. 3 is a plan view of a schematic structure of the bus bar.

Next, bus bar 2 according to the present exemplary embodiment will be described in detail. FIG. 2 is a perspective view showing a schematic structure of the bus bar. FIG. 3 is a plan view showing a schematic structure of the bus bar. Bus bar 2 has a structure in which a plurality of plates 14 are stacked. Each plate 14 has a band shape and extends in the cell stacking direction X. Each plate 14 is made of metal such as copper or aluminum and has a thickness of, for example, 0.1 mm to 0.5 mm.

Bus bar 2 includes first joint part 16, second joint part 18, and projection 20. Each plate 14 has regions constituting parts of first joint part 16, second joint part 18, and projection 20, and a plurality of plates 14 are stacked to configure first joint part 16, second joint part 18, and projection 20. Therefore, first joint part 16, second joint part 18, and projection 20 have approximately the same thickness.

First joint part 16 is joined to output terminal 8 of first cell 4a (see FIG. 1). Second joint part 18 is joined to output terminal 8 of second cell 4b (see FIG. 1). This arrangement electrically connects first cell 4a and second cell 4b to each other. First joint part 16 is located at one end part of bus bar 2, and second joint part 18 is located at the other end part of bus bar 2. First joint part 16 and second joint part 18 each has a flat plate shape.

Projection 20 is disposed between first joint part 16 and second joint part 18 and protrudes in a direction in which cells 4 and bus bar 2 are stacked (hereinafter, the direction is referred to as bus bar stacking direction Z). In the present exemplary embodiment, the bus bar stacking direction Z is assumed to be the vertical direction for descriptive purposes. In other words, projection 20 protrudes in the stacking direction of plates 14.

Projection 20 has first inclined part 22 and second inclined part 24. First inclined part 22 extends from first joint part 16 in such a direction that first inclined part 22 comes close to or gets away from cells 4. In other words, first inclined part 22 extends in a direction intersecting a planar direction (XY plane direction) parallel to first joint part 16. First inclined part 22 is a plane inclined with first joint part 16 by a predetermined angle. Second inclined part 24 extends from second joint part 18 in such a direction that second inclined part 24 comes close to or gets away from cells 4. In other words, second inclined part 24 extends in a direction intersecting a planar direction (XY plane direction) parallel to second joint part 18. Second inclined part 24 is a plane inclined with second joint part 18 by a predetermined angle.

When one of first inclined part 22 and second inclined part 24 extends to come close to cells 4, the other of first inclined part 22 and second inclined part 24 also extends to come close to cells 4, and when one of first inclined part 22 and second inclined part 24 extends to get away from cells 4, the other of first inclined part 22 and second inclined part 24 also extends to get away from cells 4. In the present exemplary embodiment, first inclined part 22 and second inclined part 24 extend to get away from cells 4. Therefore, projection 20 has an approximately U-shaped cross-sectional shape in a planar direction (XZ plane direction) including the cell stacking direction X and the bus bar stacking direction Z.

Further, first inclined part 22 and second inclined part 24 are arranged with a predetermined interval W in a first direction in which first joint part 16 and second joint part 18 are aligned. Further, first inclined part 22 and second inclined part 24 are arranged in such a manner that the interval W gradually becomes wider from one end side toward the other end side in a second direction intersecting the first direction as viewed from the bus bar stacking direction Z. In the present exemplary embodiment, the first direction is the cell stacking direction X, and the second direction is the horizontal direction Y. Specifically, regarding first inclined part 22, one end 22a in the horizontal direction Y is located nearer to a second joint part 18 side than the other end 22b is, and the other end 22b is located nearer to a first joint part 16 side than one end 22a is. Similarly, regarding second inclined part 24, one end 24a in the horizontal direction Y is located nearer to the first joint part 16 side than the other end 24b is, and the other end 24b is located nearer to the second joint part 18 side than one end 24a is.

A connection angle θ1 at which first inclined part 22 and first joint part 16 are connected to each other is constant from one end 22a side through the other end 22b side. Similarly, a connection angle θ2 at which second inclined part 24 and second joint part 18 are connected to each other is constant from one end 24a side through the other end 24b side. In other words, the angles, at a connection part between first joint part 16 and first inclined part 22 and at a connecting part between second joint part 18 and second inclined part 24, change in the same manner at any position in the second direction along the path from a first joint part 16 side to second joint part 18 side.

Further, projection 20 has flat part 26 between first inclined part 22 and second inclined part 24. Flat part 26 extends parallel to first joint part 16 and second joint part 18. First inclined part 22 connects between flat part 26 and first joint part 16, and second inclined part 24 connects between flat part 26 and second joint part 18. Therefore, flat part 26 is shifted in the bus bar stacking direction Z with respect to first joint part 16 and second joint part 18 by an amount corresponding to a height of first inclined part 22 and second inclined part 24 (a length in the bus bar stacking direction Z). Further, flat part 26 has a trapezoidal shape. More specifically, flat part 26 has an isosceles trapezoidal shape, in which one side in contact with first inclined part 22 is one leg and the other side in contact with second inclined part 24 is the other leg.

Figure 4:
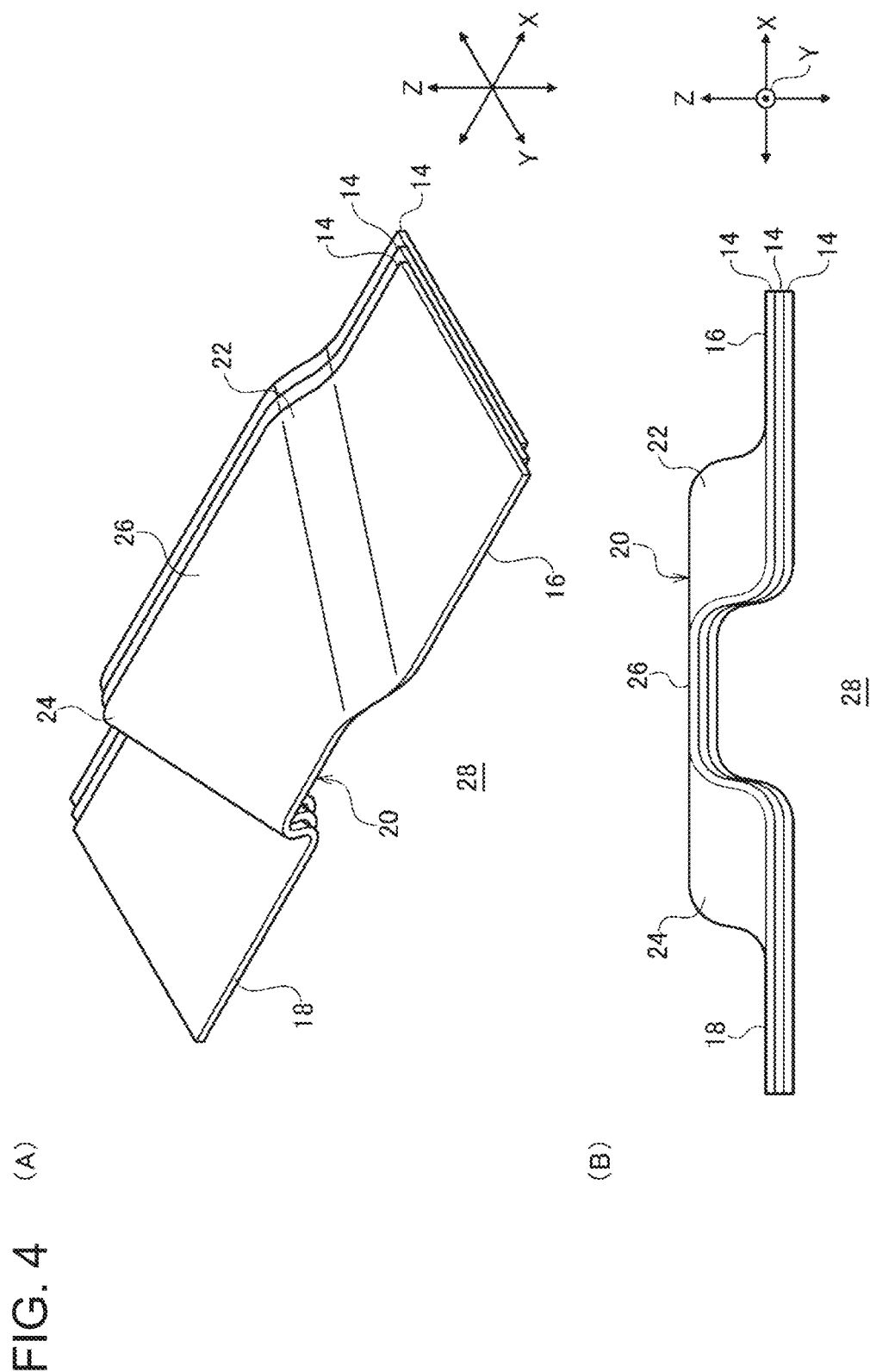
FIG. 4A is a perspective view showing a schematic structure of a plate stack formed in a manufacturing process of the bus bar.
FIG. 4B is a side view showing a schematic structure of the plate stack.

Bus bar 2 is manufactured as follows, for example. FIG. 4A is a perspective view showing a schematic structure of a plate stack formed in a manufacturing process of the bus bar. FIG. 4B is a side view showing a schematic structure of the plate stack.

First, a plurality of plates 14 each having first joint part 16, second joint part 18, and projection 20 are made. For example, plate 14 can be obtained by bending a belt-shaped flat plate to form two steps with an interval W in the longitudinal direction between the steps. One of the steps constitutes first inclined part 22, and the other of the steps constitutes second inclined part 24. Further, the part sandwiched by the two steps constitutes flat part 26. The remaining parts constitute first joint part 16 and second joint part 18. Plates 14 are each formed with the same die, and the shapes of plates 14 are identical.

Next, obtained plates 14 are stacked to form plate stack 28. As shown in FIGS. 4A and 4B, plates 14 are stacked being shifted from each other in the horizontal direction Y in plate stack 28. In this arrangement, regarding neighboring two plates 14, a part of one of the plates 14 having a narrower interval W and a part of the other of plates 14 having a wider interval W overlap each other, where the interval W is the interval between first inclined part 22 and second inclined part 24. Specifically, regarding an outer plate located on a top end side and an inner plate located on a bottom side both in a projection direction of projection 20, the part of the outer plate having the wider interval W and the part of the inner plate having the narrower interval W overlap each other.

The interval W between first inclined part 22 and second inclined part 24 includes the interval between the outer surfaces (hereinafter, referred to as outer surface interval WO, as appropriate) and the interval between the inner surfaces (hereinafter, referred to as inner surface interval WI, as appropriate). At first inclined part 22, an outer surface is a surface directed to a first joint part 16 side, and an inner surface is a surface directed to a second inclined part 24 side. In second inclined part 24, the outer surface is a surface directed to a second joint part 18 side, and the inner surface is a surface directed to a first inclined part 22 side. In each plate 14, there is a difference corresponding to the thickness of plates 14 between the outer surface interval WO and the inner surface interval WI.

However, the neighboring outer plate and inner plate are stacked being shifted in the horizontal direction Y, depending on the interval difference between the outer surface interval WO and the inner surface interval WI. As a result, projection 20 of the outer plate and projection 20 of the inner plate are overlapped each other at a part where the inner surface interval WI of the outer plate and the outer surface interval WO of the inner plate are almost the same. When comparing between the outer surface intervals WO or between the inner surface intervals WI, the part where the interval W is wider in the outer plate and the part where the interval W in the inner plate is narrower are overlapped each other.

As a result, the outer surface of the inner plate and the inner surface of the outer plate can be brought in contact with each other without creating any gap at least in the flat regions of first joint part 16, first inclined part 22, flat part 26, second joint part 18, and second inclined part 24. The flat region is the region except bent-shaped regions which connects between first joint part 16 and first inclined part 22, between first inclined part 22 and flat part 26, between second joint part 18 and second inclined part 24, and between second inclined part 24 and flat part 26.

Next, the plurality of plates 14 are joined by welding or other methods. It is preferable that the plurality of plates 14 be joined only at the flat regions of first joint parts 16 and second joint parts 18. In other words, it is preferable that no joint part of the plurality of plates 14 be provided on projections 20 of bus bars 2. This arrangement can more reliably secure flexibility of projection 20. After that, the both end parts of plate stack 28 in the horizontal direction Y are cut off such that only the region where all of plates 14 are overlapped remains. Consequently, bus bar 2 shown in FIGS. 1 to 3 is obtained. Note that when the both end parts of plate stack 28 in the horizontal direction Y is cut off, the plurality of plates 14 are joined to each other at a central part of a width direction (horizontal direction Y) of plates 14. In this case, penetration welding is used to join the plurality of plates 14, for example.

As described above, bus bar 2 according to the present exemplary embodiment has a structure in which the plurality of plates 14 are stacked, and electrically connects first cell 4a and second cell 4b to each other. Bus bar 2 has: first joint part 16 connected to output terminal 8 of first cell 4a; second joint part 18 connected to output terminal 8 of second cell 4b; and projection 20 disposed between first joint part 16 and second joint part 18. Projection 20 projects in the bus bar stacking direction Z.

Projection 20 has first inclined part 22 extending from first joint part 16 in such a direction that first inclined part 22 comes close to or gets away from cells 4 and has second inclined part 24 extending from second joint part 18 in such a direction that second inclined part 24 comes close to or gets away from cells 4. First inclined part 22 and second inclined part 24 are arranged with a predetermined interval W in a first direction in which first joint part 16 and second joint part 18 are aligned. Further, postures of first inclined part 22 and second inclined part 24 are determined with respect to each other in such a manner that the interval W gradually becomes wider from one end side toward the other end side in a second direction intersecting the first direction as viewed from the bus bar stacking direction Z. In other words, the interval W gradually changes from the one end side toward the other end side in the width direction of bus bar 2.

This arrangement enables stacked upper and lower plates 14 to be shifted in the second direction, so that it is possible to overlap the part having a narrower interval W of projection 20 of one of the plates 14 and the part having a wider interval W of projection 20 of the other of the plates 14. As a result, even when plates 14 have projection 20 with the same shape, creation of gaps between plates 14 can be avoided. Therefore, the same die can be used to produce a plurality of plates 14.

As a result, the present exemplary embodiment can provide projection 20 on bus bar 2 of a stacked-plate type while controlling or suppressing creation of gaps between plates 14 and controlling or suppressing an increase in production cost of bus bar 2. Therefore, by providing projection 20, it is possible to improve flexibility of bus bar 2 in the cell stacking direction X. Because a displacement of cells 4 can be absorbed by a deformation of projection 20, it is possible to more reliably reduce the load applied to the connecting part between bus bar 2 and output terminal 8. Therefore, stable electrical connection between cells 4 via bus bar 2 can be achieved. Further, by providing bus bar 2 of the present exemplary embodiment on cell stack 1, it is possible to improve performance of cell stack 1.

Further, the connection angle $\theta 1$ between first inclined part 22 and first joint part 16 and the connection angle $\theta 2$ between second inclined part 24 and second joint part 18 are each constant from one end side through the other end side in the second direction. In other words, connection angles $\theta 1$ and $\theta 2$ are each constant from one end side through the other end side in the width direction of bus bar 2. This arrangement can control or suppressing shifting of stacked plates 14 away from each other in the cell stacking direction X. If this shift in the cell stacking direction X can be acceptable, the connection angle $\theta 1$ or $\theta 2$ does not have to be constant from one end side through the other end side in the width direction of bus bar 2.

Further, projection 20 has flat part 26 between first inclined part 22 and second inclined part 24. This structure can make a projection height of projection 20 small. Therefore, it is possible to control an increase in dimension of bus bar 2 caused by providing projection 20. Further, it is easy to manage the dimension of bus bar 2 compared with the case where projection 20 is provided to have a shape that is totally curved from the first joint part 16 side through the second joint part 18 side. In addition, flat part 26 can also be used as a connecting part for a voltage detection line.

The present invention is not limited to the above-mentioned exemplary embodiment, and modifications such as various design changes can be added based on knowledge of those skilled in the art. The modified exemplary embodiments are also included in the scope of the present invention. A new exemplary embodiment made by adding modifications to the above-mentioned exemplary embodiment has respective effects of the combined exemplary embodiments and the modified exemplary embodiments at the same time.

In the above exemplary embodiment, cells 4 are prismatic batteries. However, a shape of cells 4 is not particularly limited and may be cylindrical, for example. The total number of cells 4 equipped on cell stack 1 is not particularly limited. The outer jackets of cells 4 may be covered with insulating sheets such as shrink tubes. The number of plates 14 constituting bus bar 2 is not particularly limited, either. The number of plates 14 can be set depending on a thickness required to bus bar 2 or other purposes.

Although, in the exemplary embodiment, the interval W between first inclined part 22 and second inclined part 24 becomes larger continuously from one end side toward the other end side in the horizontal direction Y, the interval W may become larger in stages. Projection 20 projects in such a direction that projection 20 gets away from cells 4, but projection 20 may protrude in such a direction that projection 20 comes close to cells 4. Further, projection 20 does not have to have flat part 26, and projection 20 has a shape totally curved from the first joint part 16 side to the second joint part 18 side, for example.

Although, the exemplary embodiment shows the configuration in which the both end parts of plate stack 28 in the horizontal direction Y are cut off in such a manner that the region where all of plates 14 are overlapped remains, this configuration is not particularly limitative. For example, the end part on one side in the horizontal direction Y maybe cut off, or none of the both end parts needs to be cut off. Alternatively, only part of the end part of plate stack 28 may be cut off.

In a case where a step part of plates 14 is left on bus bar 2, the step part can be brazed or plated to join plates 14 to each other. Consequently, plates 14 are more reliably joined to each other. Further, in a case where step parts are left on the regions corresponding to first joint part 16 and second joint part 18, the step parts can be used to join first joint part 16 and second joint part 18 to output terminals 8. For example, the step parts and output terminals 8 are joined by brazing. This can more reliably join bus bar 2 and output terminals 8.

The following are also effective as aspects of the present invention: any combinations of the above-described structural components; and expressions into which the expressions of the present invention are converted between method, device, system, and the like.

The invention claimed is:

1. A bus bar that electrically connects a first cell and a second cell, the bus bar comprising:
    a first joint part connected to an output terminal of the first cell;
    a second joint part connected to an output terminal of the second cell; and
    a projection that is disposed between the first joint part and the second joint part and protrudes in a stacking direction in which the cells and the bus bar are stacked,
    wherein
    the projection has a first inclined part extending from the first joint part and has a second inclined part extending from the second joint part, and
    the first inclined part and the second inclined part are arranged in such a manner that the first inclined part and the second inclined part are aligned with a predetermined interval in a first direction in which the first joint part and the second joint part are aligned and that the predetermined interval gradually gets wider in a second direction perpendicular to the first direction as viewed from the stacking direction.

2. The bus bar according to claim 1, wherein a connection angle between the first inclined part and the first joint part and a connection angle between the second inclined part and the second joint part are each constant from the first end side through the second end side.

3. The bus bar according to claim 1, wherein the projection has a flat part between the first inclined part and the second inclined part.

4. A cell stack comprising:
    the bus bar according to claim 1; and
    the first cell and the second cell that are electrically connected to each other with the bus bar.

* * * * *